(12) United States Patent
Kim

(10) Patent No.: US 9,871,422 B2
(45) Date of Patent: Jan. 16, 2018

(54) TERMINAL UNIT OF VEHICLE TRACTION MOTOR AND METHOD OF MANUFACTURING THE SAME

(71) Applicant: Hyundai Mobis Co., Ltd., Seoul (KR)

(72) Inventor: Do-Hyun Kim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 521 days.

(21) Appl. No.: 14/477,109

(22) Filed: Sep. 4, 2014

(65) Prior Publication Data

US 2016/0072350 A1 Mar. 10, 2016

(51) Int. Cl.
*H02K 1/04* (2006.01)
*H02K 11/00* (2016.01)
*H02K 3/00* (2006.01)
*H02K 3/52* (2006.01)

(52) U.S. Cl.
CPC ......... *H02K 3/522* (2013.01); *H02K 2203/09* (2013.01)

(58) Field of Classification Search
CPC .............................. H02K 3/522; H02K 5/225
USPC ................... 310/43, 68 R, 71, 179
See application file for complete search history.

(56) References Cited

U.S. PATENT DOCUMENTS

| 6,369,473 | B1 * | 4/2002 | Baumeister | H02K 3/522 |
| | | | | 310/71 |
| 2011/0215662 | A1 * | 9/2011 | Lee | H02K 3/38 |
| | | | | 310/71 |

FOREIGN PATENT DOCUMENTS

JP 2012200038 A * 10/2012
KR 10-2011-0101333 A 9/2011

* cited by examiner

*Primary Examiner* — Jose Gonzalez Quinones
(74) *Attorney, Agent, or Firm* — NSIP Law

(57) ABSTRACT

A terminal unit of a vehicle traction motor includes a terminal mold, bus bars which are assembled and fixed in within the terminal mold, and insulation spacers which are alternately and sequentially inserted and assembled between the bus bars and have different diameters from each other.

9 Claims, 9 Drawing Sheets

TERMINAL UNIT OF VEHICLE TRACTION MOTOR AND METHOD OF MANUFACTURING THE SAME

TECHNICAL FIELD

Exemplary embodiments of the invention relate to a terminal unit of a traction motor; and, particularly, to a power distribution module for a traction motor used in a terminal which is a power supply portion of a traction motor.

BACKGROUND

A terminal unit of a traction motor is a module which supplies a traction motor with a voltage input from the outside. Referring to FIG. 1, a conventional terminal unit of a traction motor 10 is assembled of a terminal frame or terminal mold 12, a frame cover or mold cover 13, a plurality of bus bars 15, and spacers 17 for insulating the bus bars 15, which are fixed and insulated by silicon. As shown in FIG. 1, the mold cover 13 is coupled to the terminal mold 12, and extends and protrudes from the terminal mold 12.

In detail, the conventional terminal unit of a traction motor 10 has a structure in which the plurality of non-insulated bus bars 15 are press-fitted to the terminal mold 12 using the spacers 17 after being assembled to the terminal mold 12, so as to maintain distances between the respective bus bars 15. Insulation is provided by filling parts in which the spacers 17 are not present with silicon. Here, each of the spacers 17 includes a plurality of spaced-apart wall members, and the spacers 17 are assembled in the form of a partition wall in the terminal unit of a traction motor 10, as shown in an enlarged view of FIG. 1.

However, in a process of press-fitting the spacers 17 in the conventional terminal unit of a traction motor 10, the possibility of generating foreign substances on the plating of the bus bars 15 may increase, thereby allowing insulation and durability to be reduced.

FIG. 2 is a partial perspective view illustrating the terminal mold 12 in the conventional terminal unit of a traction motor 10. FIG. 3 is a cross-sectional perspective view taken along line III-III' of FIG. 2. Referring to FIGS. 2 and 3, the terminal unit of a traction motor 10 has a problem of reduced insulation and durability since empty spaces are present between the spacers 15 after press-fitting thereof, as shown in portion "A" of FIG. 3.

SUMMARY

An embodiment of the invention is directed to a terminal unit of a vehicle traction motor and a method of manufacturing the same, capable of improving a form and an assembly structure of each spacer inserted between bus bars so as to reduce an amount of conductive foreign substances generated during an assembly process, and capable of simultaneously minimizing insulation reduction caused due to the generated foreign substances.

Other objects and advantages of the invention can be understood by the following description, and become apparent with reference to the embodiments of the invention. Also, it is obvious to those skilled in the art to which the invention pertains that the objects and advantages of the invention can be realized by the means as claimed and combinations thereof.

In accordance with an embodiment of the invention, a terminal unit of a vehicle traction motor includes a terminal mold, a plurality of bus bars positioned within the terminal mold and having different diameters from each other, and a plurality of insulation spacers positioned and assembled alternately with respect to the plurality of bus bars within the terminal mold such that each insulation spacer among the plurality of insulation spacers is positioned between two bus bars among the plurality of bus bars.

A side surface inside the terminal mold may include a stepped portion which supports a lower surface of an innermost bus bar among the plurality of bus bars.

Each insulation spacer among the plurality of insulation spacers may include a bent portion which extends radially at a lower surface of the insulation spacer to support a lower surface of a respective bus bar among the plurality of bus bars.

In addition, the plurality bus bars and the plurality of insulation spacers may be fixed to the terminal mold by an overmold.

Alternatively, the plurality of bus bars and the plurality of insulation spacers may be fixed to the terminal mold by resin.

Each insulation spacer among the plurality of insulation spacers may have a four-piece structure enabling a diameter of the insulation spacer to be adjustable during assembly with a respective bus bar among the plurality of bus bars.

Each bus bar among the plurality of bus bars and each insulation spacer among the plurality of insulation spacers may have an annular shape.

In accordance with another embodiment of the invention, a method of manufacturing a terminal unit of a vehicle traction motor includes preparing a terminal mold, preparing a plurality of bus bars having different diameters from each other, preparing a plurality of insulation spacers, and inserting and assembling the plurality of insulation spacers alternately with respect to the plurality of bus bars within the terminal mold such that each insulation spacer among the plurality of insulation spacers is positioned between two bus bars among the plurality of bus bars.

In addition, the method may further include fixing the plurality of bus bars and the plurality of insulation spacers to the terminal mold using an overmold.

Alternatively, the method may further include fixing the plurality of bus bars and the plurality of insulation spacers to the terminal mold using resin.

DETAILED DESCRIPTION

Figure 1:
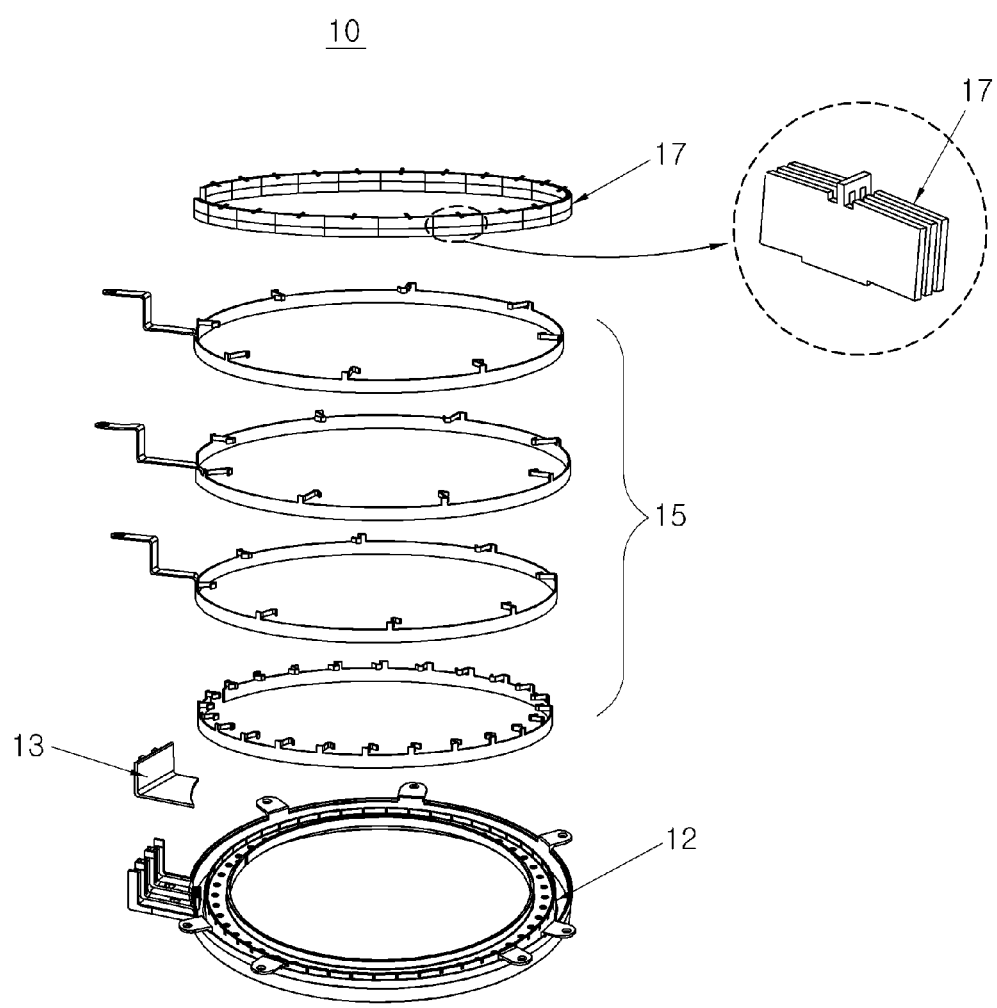
FIG. 1 is an exploded perspective view illustrating a conventional terminal unit of a vehicle traction motor.
Figure 2:
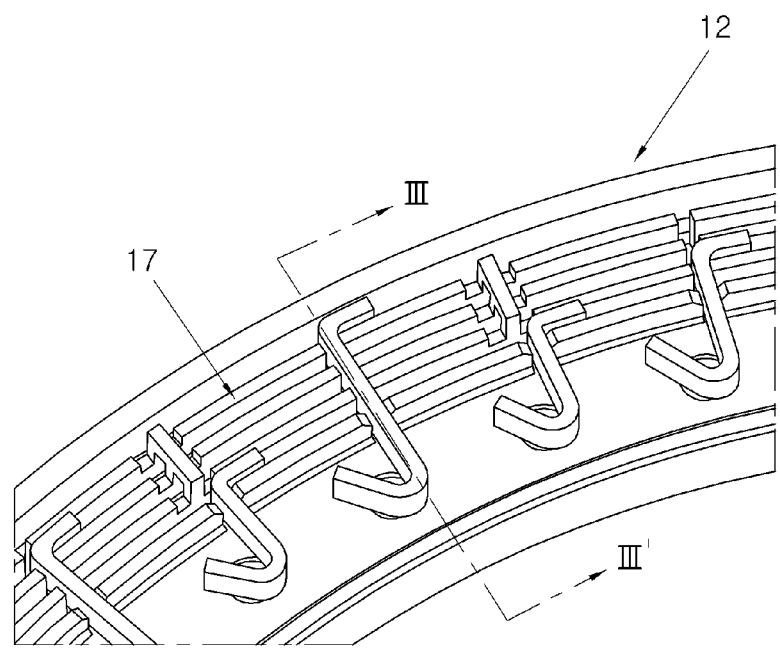
FIG. 2 is a partial perspective view illustrating a structure in which spacers and bus bars are assembled to a conventional terminal mold.
Figure 3:
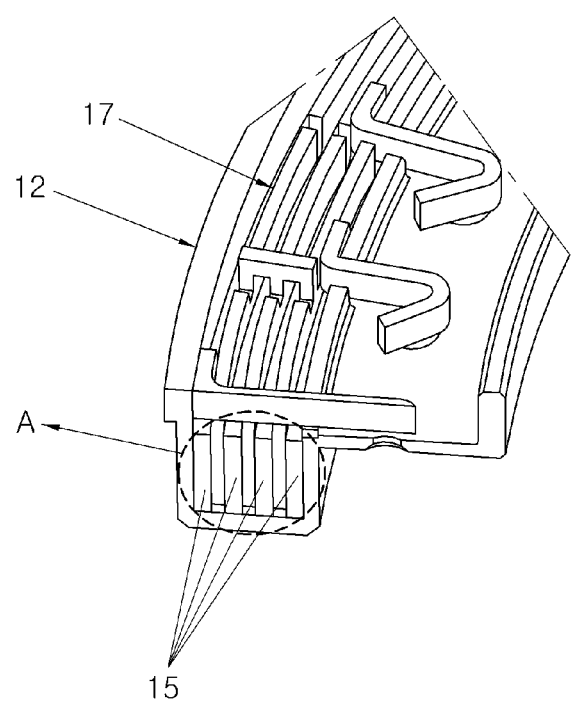
FIG. 3 is a cross-sectional perspective view taken along line III-III' of FIG. 2.

A terminal unit of a vehicle traction motor according to exemplary embodiments of the invention will be described below in more detail with reference to the accompanying drawings. The invention may, however, be embodied in different forms and should not be construed as limited to the embodiments set forth herein. Rather, these embodiments are provided so that this disclosure will be thorough and complete, and will fully convey the scope of the invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Figure 4:
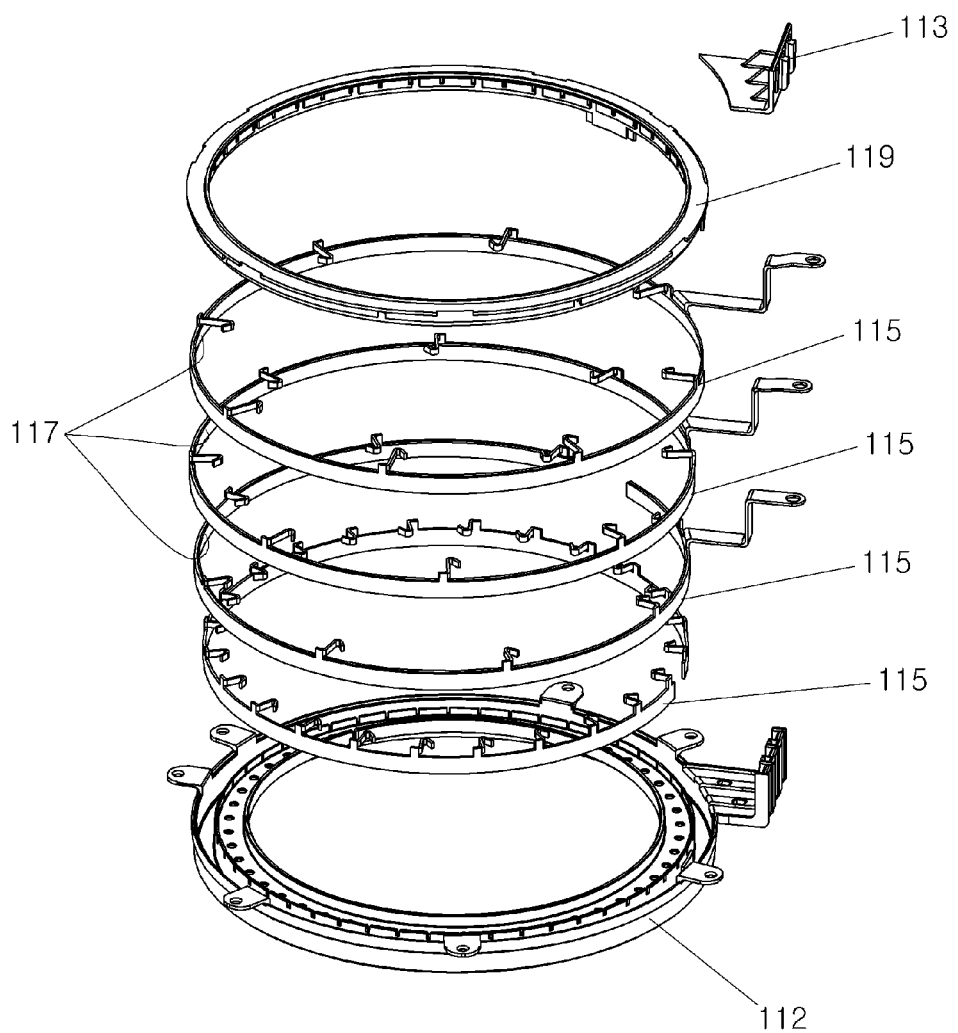
FIG. 4 is an exploded perspective view illustrating a terminal unit of a vehicle traction motor according to an embodiment of the invention.
Figure 5:
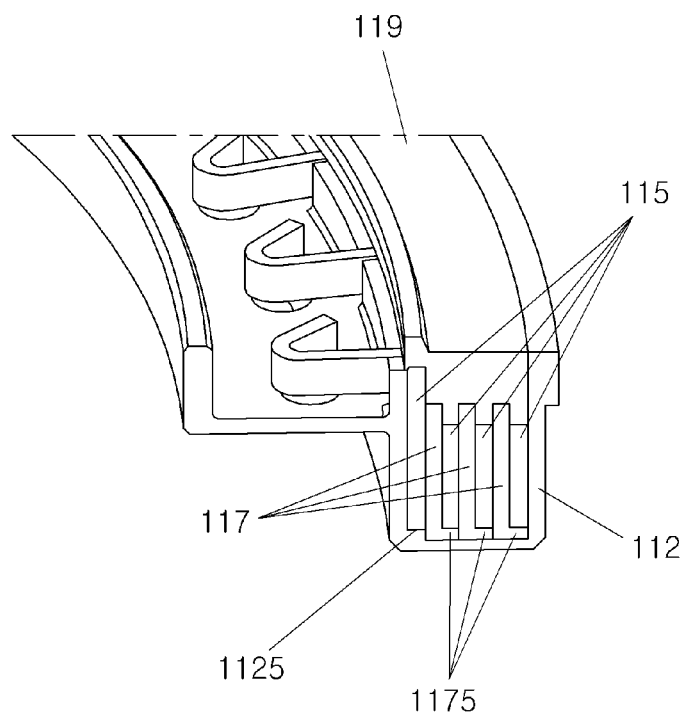
FIG. 5 is a partial cross-sectional perspective view illustrating the terminal unit of a vehicle traction motor according to the embodiment of the invention.

FIG. 4 is an exploded perspective view illustrating a terminal unit of a vehicle traction motor 100 according to an embodiment of the invention. FIG. 5 is a partial cross-sectional perspective view illustrating the terminal unit of a vehicle traction motor 100.

Referring to FIGS. 4 and 5, the terminal unit of a vehicle traction motor 100 includes annular bus bars 115, annular spacers 117, and an annular terminal frame or terminal mold 112.

The bus bars 115 and the spacers 117 may be received in the terminal mold 112 to be fixed within the terminal mold 112 by an overmold 119 or resin. Subsequently, a frame cover or mold cover 113 is attached to the terminal mold 112.

The bus bars 115 are provided corresponding to phases U, V, W, and N of power connected thereto. As shown in FIG. 5, the bus bars 115 may be sequentially overlapped and assembled to the terminal mold 112 while interposing the spacers 117 having different diameters therebetween. More specifically, the bus bars 115 and spacers 117 may be arranged in the terminal mold 112 such that a spacer 117 is positioned between adjacent bus bars 115.

In the terminal unit of a vehicle traction motor 100 according to the embodiment shown, since the bus bars 115 and the spacers 117 are sequentially assembled to the terminal mold 112, empty spaces are not present between the spacers 117, unlike the related art.

The spacers 117 according to the embodiment shown herein are inserted between the bus bars 115 to insulate between the bus bars 115. The spacers 117 may have different diameters from each other so as to be inserted between the bus bars 115.

Figure 6:
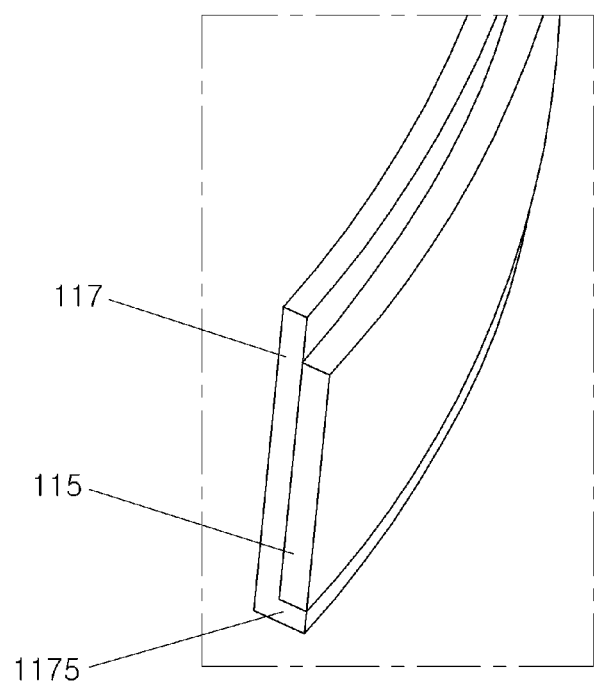
FIG. 6 is a partial cross-sectional perspective view illustrating an assembled structure of a spacer and a bus bar of FIG. 4.

As shown in FIG. 6, an inside surfaces of the bus bars 115 are coupled to outside surfaces of respective spacers 117. Each spacer 117 has a bent portion 1175 extending radially outwardly at a lower surface of the spacer 117. As shown in FIGS. 5 and 6, the bent portions 1175 formed on the respective spacers 117 support lower surfaces of the respective bus bars 115.

Although each of the spacers 117 according to the embodiment generally has an "L" shape with the bent portion 1175 extending radially outwardly at the lower surface of the spacer 117, the bent portion 1175 may alternatively extend radially inwardly at the lower surface of the spacer 117.

The terminal unit of a vehicle traction motor 100 according to the disclosed embodiment may enhance durability and insulation by having a structure in which the bus bars 115 are supported by the respective bent portions 1175 of the spacers 117 so that the spacers 117 may block effects between the bus bars 115 due to foreign substances generated during an assembly process.

Figure 7:
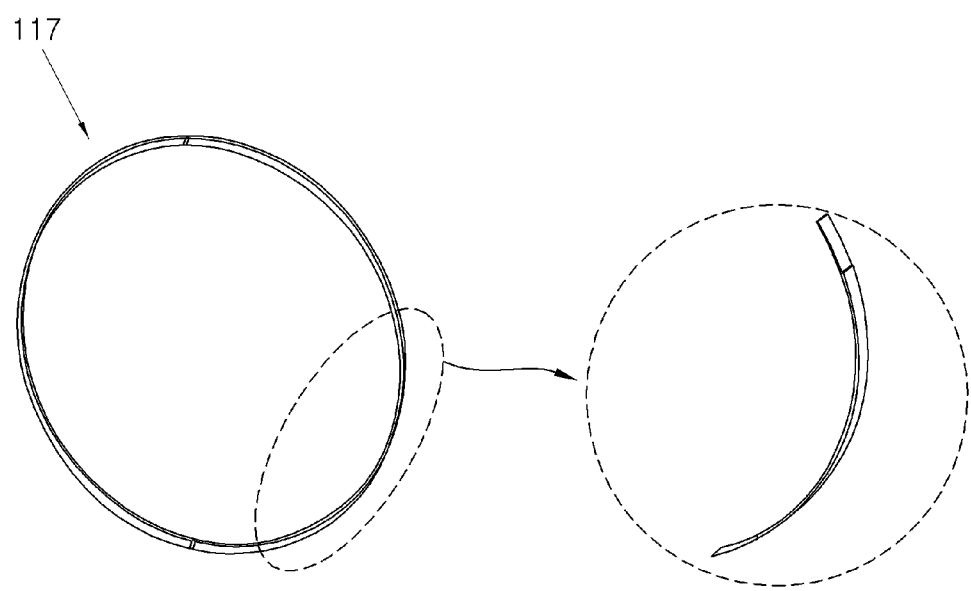
FIG. 7 is a view showing the spacer of FIG. 4.

Each of the spacers 117 according to the embodiment may have a multi-piece (e.g., 4-piece) structure that allows a diameter of the spacer 117 to be adjustable during assembly thereof. For example, as shown in FIG. 7, each spacer 117 may be formed by four arcuate segments which may be assembled to form an annular shape. Accordingly, the spacers 117 may be manufactured at low costs since spacers having different diameters need not be separately manufactured so as to correspond to diameters of the bus bars 115.

Figure 8:
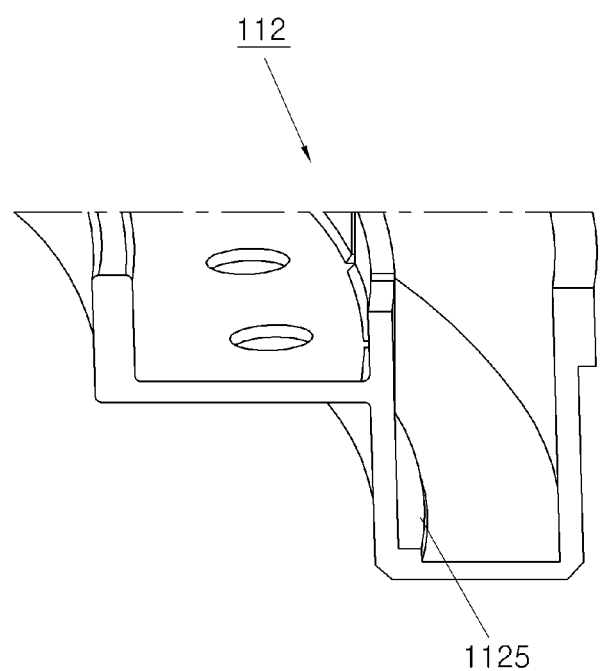
FIG. 8 is a cross-sectional perspective view showing the terminal mold of FIG. 4.
Figure 9:
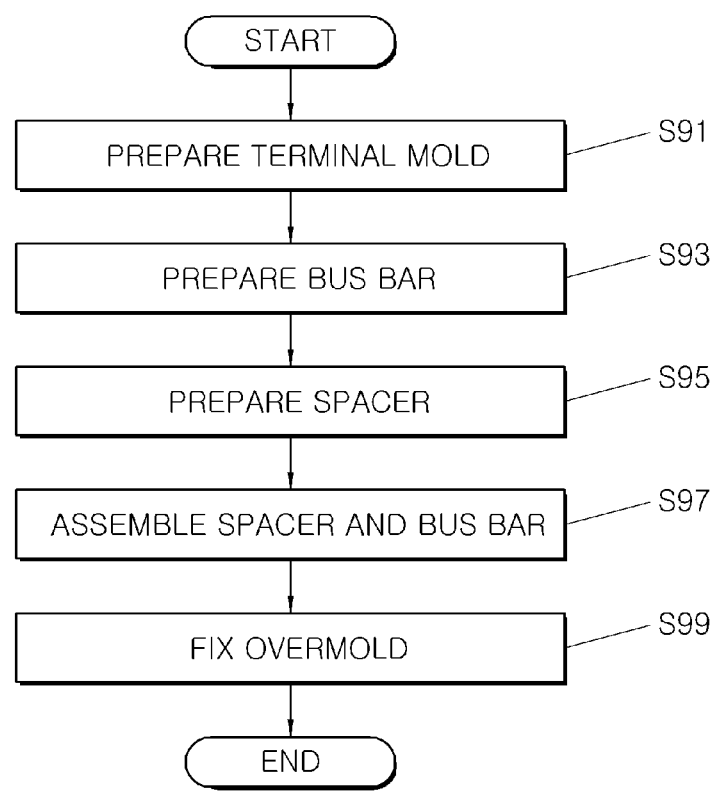
FIG. 9 is a flowchart illustrating a method of manufacturing the terminal unit of a vehicle traction motor according to an embodiment of the invention.

The terminal mold 112 according to the embodiment disclosed herein receives and fixes the bus bars 115 and the spacers 117. As shown in FIG. 8, the terminal mold 112 has a stepped portion 1125 formed at one side surface therein.

As shown in FIG. 5, the stepped portion 1125 supports the lower surface of a radially innermost bus bar 115, which contacts an inner side surface inside the terminal mold 112 and contacts an inside surface of the radially innermost spacer 117 opposite to the outer surface of the radially innermost spacer 117 formed with the bent portion 1175. That is, a leftmost bus bar 115 of the bus bars 115 received in the terminal mold 112 is supported by the stepped portion 1125. An outermost, or rightmost, bus bar 115 contacts an outer side surface inside the terminal mold 112.

The bus bars 115 and the spacers 117 assembled to the terminal mold 112 may be fixed within the terminal mold 112 by an overmold 119 as shown in FIG. 5. Alternatively, the bus bars 115 and the spacers 117 may also be fixed by resin. However, a fixing method using the overmold 119 may simplify a manufacturing process since a resin application process may be eliminated.

Hereinafter, a method of manufacturing the terminal unit of a vehicle traction motor according to an embodiment of the invention will be described with reference to FIGS. 5 to 9.

The method of manufacturing the terminal unit of a vehicle traction motor according to an embodiment of the invention includes first preparing the terminal mold 112 (S91), and preparing the annular bus bars 115 having different diameters from each other so as to correspond to the respective phases of power connected thereto (S93).

Next, the method includes preparing the annular spacers 117 having different diameters from each other so as to correspond to the bus bars 115 such that the spacers 117 can be inserted and assembled between the bus bars 115 (S95). The annular spacers 117 may have the bent portions 1175 which are bent radially outwardly at the lower surfaces of the spacers 117 so as to support the lower surfaces of the bus bars 115.

Next, the bus bars 115 and the spacers 117 are sequentially overlapped and assembled to the terminal mold 112 (S97). The bus bars 115 are assembled to the spacers 117 such that the inside surfaces of the bus bars 115 contact the outside surfaces of the respective spacers 117. With the exception of the innermost bus bar 115, the lower surfaces of the bus bars 115 are supported by the respective bent portions 1175.

In addition, the stepped portion 1125 may support the bus bar 115, which contacts an inner side surface inside the terminal mold 112 and contacts an inside surface of the radially innermost spacer 117 opposite to the outer surface of the radially innermost spacer 117 formed with the bent portion 1175.

As shown in FIG. 5, the bus bars 115 and the spacers 117, which are assembled to and received in the terminal mold 112, are fixed within the terminal mold 112 by the overmold 119 (S99).

In step S95, since each spacer 117 according to the embodiment has a four-piece structure, the diameters of the spacers 117 are adjustable during assembly thereof. Therefore, the present invention may manufacture the spacers 117 using only one mold, compared to requiring three molds to manufacture the spacers 117 for the respective phases in the related art.

Thus, the spacers 117 according to the disclosed embodiment may be manufactured at low costs in comparison to the related art. In addition, when the overmold 119 is used to fix the bus bars 115 and the spacers 117 in step S99, it may be possible to simplify a manufacturing process since a resin application process may be eliminated.

As is apparent from the above description, the invention may enhance durability and insulation due to the spacers having bent portions for supporting respective bus bars so that the spacers may block effects between the bus bars due to foreign substances generated during an assembly process.

In addition, the invention may enhance insulation since foreign substances generated during the assembly process are reduced by insulating between the bus bars by the annular spacers having different diameters to minimize empty spaces between the spacers. The invention may simultaneously enhance vibration resistance and shock resistance since internal components are securely fixed.

While the present invention has been described with respect to the specific embodiments, it will be apparent to those skilled in the art that various changes and modifications may be made without departing from the spirit and scope of the invention as defined in the following claims.

What is claimed is:

1. A terminal of a vehicle traction motor, comprising:
   a terminal mold;
   an insulator;
   bus bars positioned within the terminal mold; and
   insulation spacers positioned alternately with respect to the bus bars such that each insulation spacer among the insulation spacers is positioned between two bus bars among the bus bars,
   wherein a diameter of each bus bar among the bus bars is different from diameters of other bus bars among the bus bar,
   wherein the bus bars comprise an inner bus bar, middle bus bars, and an outer bus bar,
   wherein each of the middle bus bars comprises a first surface, a second surface, a third surface, and a fourth surface, and
   wherein the first surface is in contact with one of the insulation spacers, the second surface is in contact with the one of the insulation spacers, the third surface is in contact with another of the insulation spacers, and the fourth surface is in contact with the insulator.

2. The terminal of claim 1, wherein a side surface inside the terminal mold comprises a stepped portion supporting a lower surface of the inner bus bar.

3. The terminal of claim 1, wherein the each insulation spacer comprises a bent portion extending radially at a lower surface of the insulation spacer to support the second surface and a lower surface of the outer bus bar.

4. The terminal unit of claim 1, wherein the bus bars and the insulation spacers are fixed to the terminal mold by the insulator, and wherein the insulator is an overmold.

5. The terminal of claim 1, wherein the bus bars and the insulation spacers are fixed to the terminal mold by the insulator, and wherein the insulator is resin.

6. The terminal of claim 1, wherein the each insulation spacer comprises a four-piece structure enabling a diameter of the each insulation spacer to be adjustable during assembly with a respective bus bar among the bus bars.

7. The terminal of claim 1, wherein the each bus bar comprises an annular shape and the each insulation spacer comprises an annular shape.

8. The terminal of claim 1, wherein the each bus bar corresponds to a phase of connected power.

9. The terminal of claim 1, wherein the insulator is level with a lip of the terminal mold.

* * * * *